United States Patent [19]

Hall

[11] Patent Number: 5,285,887
[45] Date of Patent: Feb. 15, 1994

[54] ACCUMULATING CONVEYOR AND CONTROL SYSTEM

[75] Inventor: David V. Hall, Wilmington, N.C.

[73] Assignee: Interroll Holding A. G., San Antonio, Switzerland

[21] Appl. No.: 980,335

[22] Filed: Nov. 23, 1992

[51] Int. Cl.[5] .............................................. B65G 47/26
[52] U.S. Cl. .................................... 198/460; 198/572; 198/575; 198/577; 198/781
[58] Field of Search ............... 198/460, 572, 575, 577, 198/781, 784, 788

[56] References Cited

U.S. PATENT DOCUMENTS

| | | | |
|---|---|---|---|
| 4,227,607 | 10/1980 | Malavenda | 198/460 |
| 4,240,538 | 12/1980 | Hawkes et al. | 198/460 X |
| 4,572,353 | 2/1986 | Felder | 198/784 X |
| 4,781,283 | 11/1988 | Bentley et al. | 198/460 |
| 4,817,784 | 4/1989 | Judge | 198/781 |
| 4,919,255 | 4/1991 | Morgan et al. | 198/781 |
| 5,016,748 | 5/1991 | Garzelloni | 198/781 |
| 5,042,644 | 8/1991 | Davis | 198/781 |
| 5,058,727 | 12/1991 | Jahns et al. | 198/572 X |
| 5,060,785 | 10/1991 | Garrity | 198/781 |
| 5,070,995 | 12/1991 | Schaffer et al. | 198/460 |
| 5,083,655 | 1/1992 | Becker | 198/460 |
| 5,086,910 | 2/1992 | Terpstra | 198/781 X |

FOREIGN PATENT DOCUMENTS

| | | | |
|---|---|---|---|
| 0159982 | 12/1979 | Japan | 198/788 |
| 0004810 | 1/1982 | Japan | 198/788 |

*Primary Examiner*—D. Glenn Dayoan
*Attorney, Agent, or Firm*—Rhodes, Coats & Bennett

[57] ABSTRACT

An accumulating conveyor includes a plurality of zones extending from the first end of the conveyor to a second end. Each zone includes its own independently operable electric drive motor which can be activated independently of the drive motors in the other zones of the conveyor to drive a respective zone in either a reverse or forward direction. Each zone includes a sensor for sensing the presence or absence of a load in such zones and the direction of a respective zone. An electrical control circuit is operatively connected with the sensing means and the electric motor for each zone. The control circuit is operable to actuate a first one of the accumulating zones and the immediately adjacent downstream zone when a load is present in the first one of said zones and no load is present in the immediately adjacent downstream zone.

4 Claims, 7 Drawing Sheets

FIG. 10

| STATUS | EMPTY | EMPTY | EMPTY | EMPTY | EMPTY | EMPTY | EMPTY | EMPTY |
|---|---|---|---|---|---|---|---|---|
| POWER | OFF | OFF | OFF | OFF | OFF | OFF | OFF | OFF |
| MODE | STANDBY | STANDBY | STANDBY | STANDBY | STANDBY | STANDBY | STANDBY | STANDBY |

FIG. 11

| STATUS | EMPTY | EMPTY | EMPTY | EMPTY | EMPTY | FULL | EMPTY | EMPTY |
|---|---|---|---|---|---|---|---|---|
| POWER | OFF | OFF | OFF | OFF | ON | ON | OFF | OFF |
| MODE | STANDBY | STANDBY | STANDBY | STANDBY | ACCEPT | DISCHARGE | STANDBY | STANDBY |

FIG. 12

| STATUS | FULL | FULL | FULL | EMPTY | FULL | EMPTY | EMPTY | FULL |
|---|---|---|---|---|---|---|---|---|
| POWER | OFF | OFF | OFF | ON | ON | OFF | ON | ON |
| MODE | STOP | ACCUMULATE | ACCUMULATE | ACCEPT | DISCHARGE | NO NEED | NO NEED | DISCHARGE |

FIG. 13

| STATUS | FULL | EMPTY | FULL | FULL | FULL | FULL | EMPTY | EMPTY |
|---|---|---|---|---|---|---|---|---|
| POWER | OFF | ON | ON | OFF | OFF | OFF | OFF | OFF |
| MODE | DISCHARGE | ACCEPT | DISCHARGE | ACCUMULATE | ACCUMULATE | ACCUMULATE | STANDBY | STANDBY |

FIG. 14

| STATUS | FULL | FULL | FULL | FULL | FULL | EMPTY | EMPTY | EMPTY |
|---|---|---|---|---|---|---|---|---|
| POWER | ON | ON | ON | ON | ON | ON | ON | ON |
| MODE | OVERRIDE | OVERRIDE | OVERRIDE | OVERRIDE | OVERRIDE | OVERRIDE | OVERRIDE | OVERRIDE |

ACCUMULATING CONVEYOR AND CONTROL SYSTEM

BACKGROUND OF THE INVENTION

The present invention relates generally to accumulating conveyors and more particularly to a control system for a zero pressure accumulating conveyor wherein loads accumulate without contacting one another.

In automated conveyor systems, it is common to accumulate the articles being conveyed at the downstream end of the conveyor system. For example, during a disruption in a downstream process, articles on the conveyor are sometimes allowed to accumulate or backup on the conveyor. Also, articles are sometimes allowed to accumulate so that some other process, such as packaging, can be performed on the articles before being sent downstream.

In general, an accumulating conveyor has a plurality of zones extending from an inlet end of the conveyor to the discharge end. In existing state of the art accumulating conveyors, all zones are normally live. The zones are deactivated only when there is an obstruction, such as another load, in the immediately adjacent downstream zone. When an article is stopped at a discharge end of the conveyor, the zones are successively deactivated from the discharge end back toward the inlet end as the loads accumulate. When the load at the discharge end is removed, the zones are reactivated in sequence from the discharge end to the inlet end.

One drawback with existing state of the art accumulating conveyors is that many zones will continue to be operated even when they are empty resulting in an unnecessary waste of energy and an easily avoidable wear on mechanical components. At any given moment, up to 90% of the conveyor may be empty. Nevertheless, the main drive system, including typically a motor, gear box, chains or belts, rollers, idlers and other mechanical devices, are in motion consuming energy and creating noise, dust, and unnecessary wear on mechanical components. As a result, existing accumulating conveyors are inefficient and costly to operate.

SUMMARY AND OBJECTS OF THE INVENTION

The present invention is a zero-pressure accumulating conveyor in which articles can be accumulated without contacting one another. The accumulating conveyor has a plurality of individually controlled zones. Each zone will typically include one DC electric conveyor roller and multiple slave driven idler rollers. Each zone further includes a controller which communicates with the controller for the adjacent upstream and downstream zones, and an article sensing means, such as a photoelectric cell, for sensing the presence of articles within that zone.

The present invention differs from existing state of the art accumulating conveyors because the normal mode for any given zone is nonoperational (i.e. standby mode). Individual zones are energized only when (1) there is a product arriving from the adjacent upstream zone and the zone being controlled is empty (the acceptance mode) or (2) when the zone being controlled is occupied and the adjacent downstream zone is empty (the discharge mode). Since the presence of an empty zone is required to allow movement of an article, the articles will be automatically separated upon discharge.

In some circumstances, after a number of articles have accumulated at the discharge end of the conveyor line, it may be desirable to release the articles simultaneously in a group. The controller of the present invention allows the operator to override the normal function of the conveyor to energize a group of zones simultaneously. Further, the addition of a switch at any zone in the system allows that zone to become an index point where the product automatically pauses until released after processing or inspection.

The accumulating conveyor of the present system consumes less energy, creates less noise, and results in reduced wear of mechanical parts as compared to prior art conveyor systems. These advantages are realized because zones which are not conveying articles are placed in a standby mode, and are not operated unless receiving or discharging a load.

Based on the foregoing, it is a primary object of the present invention to provide a zero-pressure accumulating conveyor system which will consume less energy than prior art conveyors and therefore result in a substantial savings in operating costs.

Another object of the present invention is to provide a zero-pressure accumulating conveyor system which results in substantial reduction in wear of mechanical components and thereby reduces maintenance costs and losses due to shut-downs for repair and maintenance.

Another object of the present invention is to provide a zero-pressure accumulating conveyor in which a substantial degree of noise reduction is achieved as compared to prior art conveyors.

Still another object of the present invention is to provide a zero-pressure accumulating conveyor which requires a fewer number of parts as compared to prior art conveyors and which is relatively easy to install and maintain.

Other objects and advantages of the present invention will become apparent and obvious from a study of the following description and the accompanying drawings which are merely illustrative of such invention.

BRIEF DESCRIPTION OF THE DRAWINGS

FIGS. 10-14 are schematic diagrams illustrating how the conveyor operates.

DETAILED DESCRIPTION OF THE INVENTION

Figure 1:
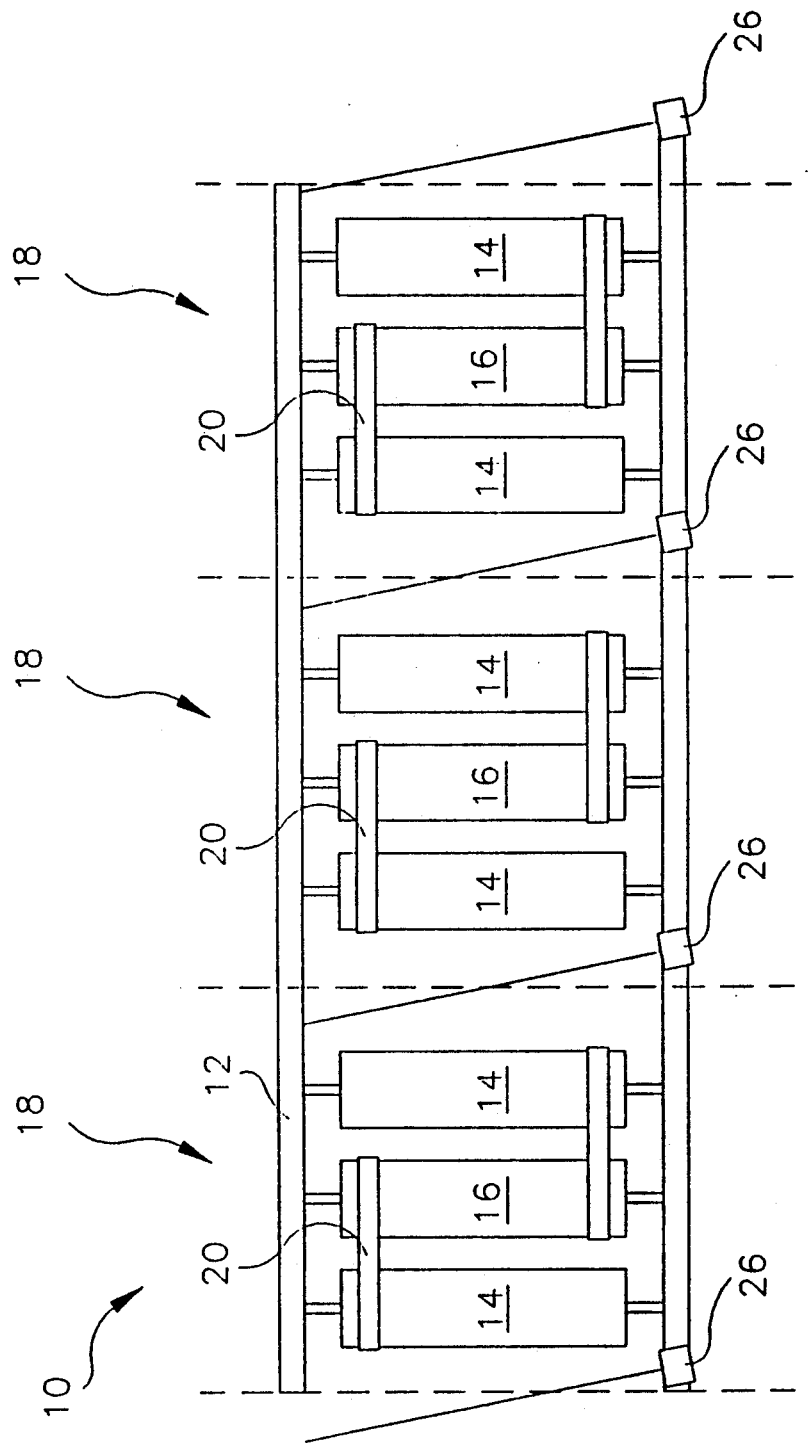
FIG. 1 is a plan view of the accumulating conveyor of the present invention.

Referring now to the drawings, the accumulating conveyor of the present invention is shown therein and indicated generally by the numeral 10. The conveyor 10 includes a conveyor frame having two side rails 12 and a plurality of zones 18 extending from an upstream end of the conveyor 10 to a downstream end. Each zone 18 includes at least one drive roller 16, and a plurality of slave-driven idler rollers 14. The idler rollers 14 are driven by the drive roller 16 for the same zone. More particularly, the idler rollers 14 are operatively connected to the drive roller 16 by a belt 20 so that the idler rollers 14 are driven by the drive roller 16. The rollers 14 and 16 collectively define a load-carrying surface on which the loads are transported.

In the preferred embodiment of the invention, each drive roller 16 includes a self-contained drive assembly and thus requires no external drive means. Briefly, the drive roller 16 includes a hollow, roller tube having a DC permanent magnet motor 30 (FIG. 3) disposed inside the roller tube. The motor 30 is connected to a multi-stage planetary gear assembly which in turn drives a drive member. The drive member frictionally engages the inside of the roller tube. Torque is applied to the roller tube by the drive member to rotate the roller tube. A more detailed description of the drive roller 16 can be found in U.S. Pat. No. 5,089,596 which is incorporated herein by reference.

In most prior art accumulating conveyors, the zones 18 of conveyor 10 are normally live and a control means is used to deactivate the zones 18 in sequence from the discharge end to the inlet end as loads accumulate. When the load at the discharge end is removed, the zones are reactivated in sequence. The present invention departs from the prior art practice of a normally live conveyor. Instead, the zones of the accumulating conveyor 10 of the present invention are normally dead, i.e. non-operational, when no loads are present on the conveyor.

The control circuit functions to activate selected zones when an article is present on the conveyor. The zones activated will be the zone occupied by the load and the immediately adjacent downstream zone. All other zones will remain dead. Each time the load is transferred from one zone to another, the zone previously occupied by the load is deactivated and the next adjacent downstream zone is activated. The zones of the conveyor are successively activated and deactivated in this manner until the load reaches the forwardmost unoccupied zone. Upon reaching the forwardmost unoccupied zone, the load will automatically stop.

Figure 2:
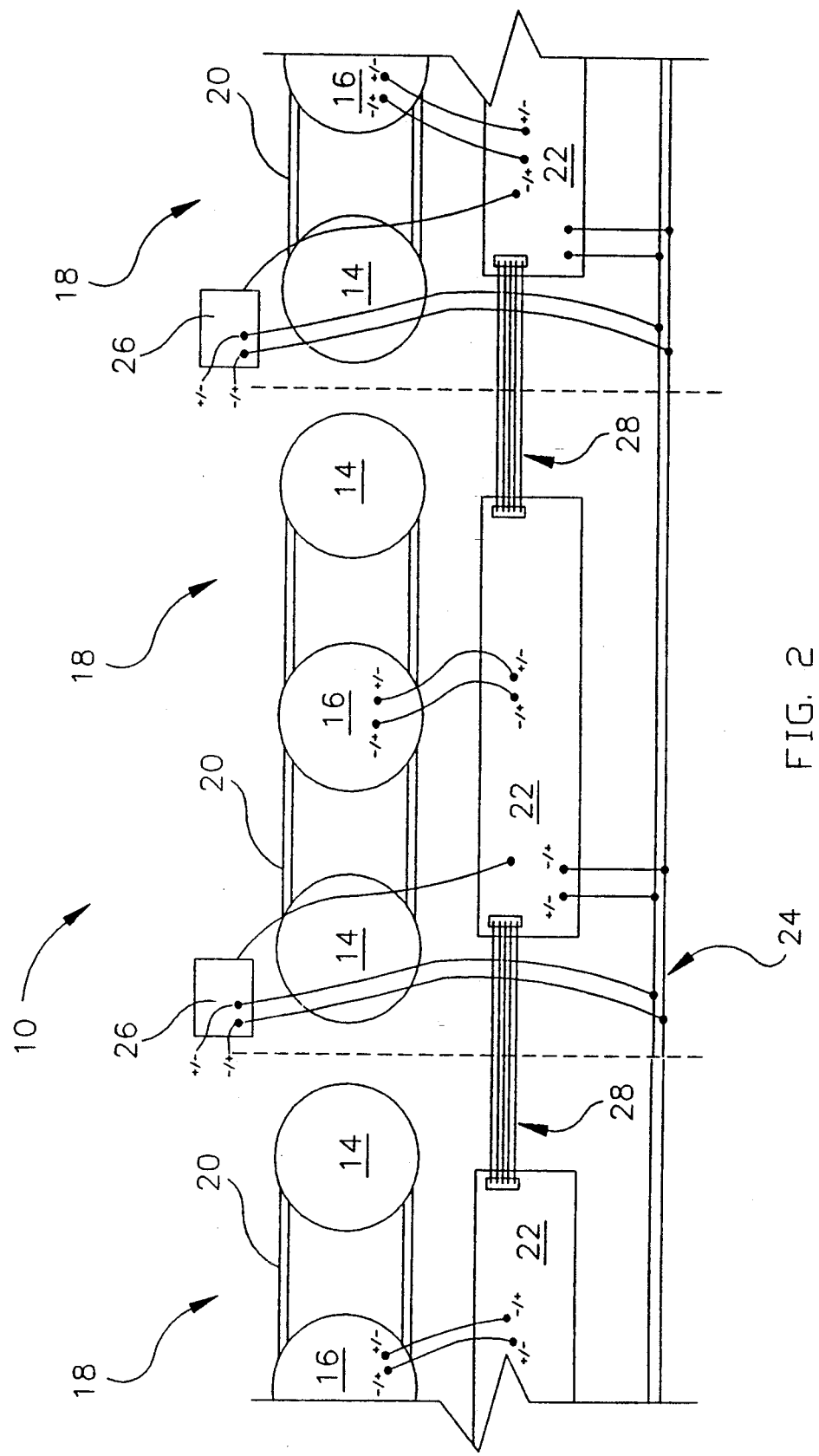
FIG. 2 is a schematic diagram of the accumulating conveyor and the control system therefore.

Referring now to FIG. 2, there is a schematic diagram of the control system of the present invention. The control system includes an individual zone controller 22 for each zone of the conveyor and a sensor 26 disposed between each zone 18 and at each end of the conveyor 10. The controllers 22 are operatively connected between a power bus 24 and the drive roller 16 for the same zone. Each controller 22 is also connected to a respective sensor 26 which provides an electrical input signal to the zone controller 22 indicative of the presence or absence of a load in that zone. The sensors 26 detect the presence of a load zone 18 and provide an input signal to their respective controller 22. For best operation, it is preferable that the sensor 26 be located adjacent the downstream edge of the zone 18. If the sensor 26 is placed further upstream, the sensor 26 could indicate that the zone 18 is empty even though a load is still partially within the zone. By positioning the sensor 26 at the downstream edge of the zone 18, this potential problem is eliminated.

The controllers 22 are operatively connected to one another to form a daisy-chain. That is, each controller is connected by a 5-wire data bus 28 to the immediately adjacent upstream and downstream zones. Each controller 22 receives an input signal from the adjacent zone or zones which is indicative of the presence or absence of a load in the adjacent zones, and outputs a signal to the adjacent zone or zones which is indicative of the presence or absence of a load in that zone.

Figure 3:
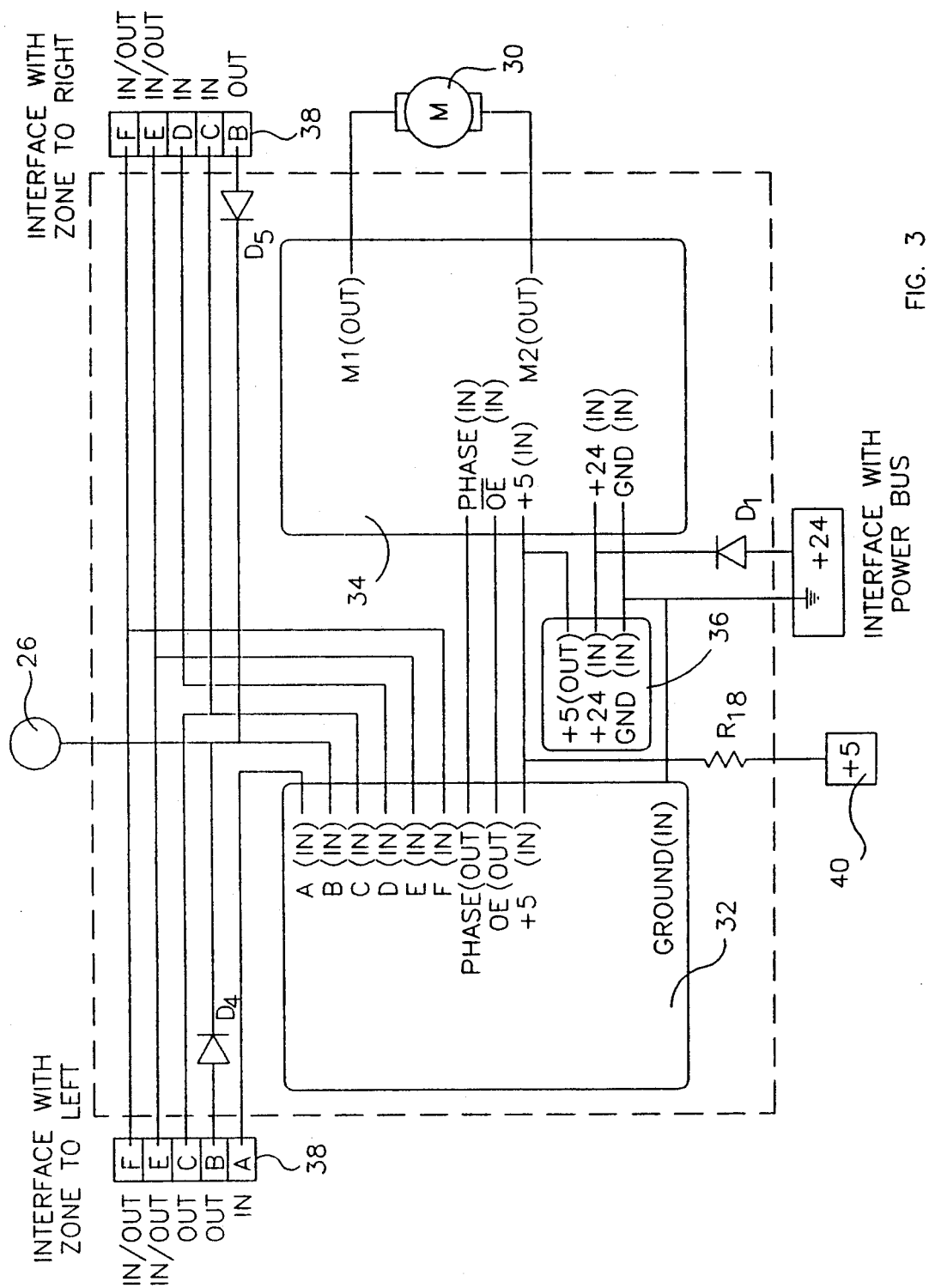
FIG. 3 is a schematic block diagram of the controller.

The controller 22 is shown in more detail in FIGS. 3-6. FIG. 3, which is a schematic block diagram, illustrates the main components of the controller 22. Each controller 22 includes a logic circuit 32, a voltage regulating circuit 34, and a power circuit 36. The components of the controller 22 are shown in Table 1. Input and output to and from the controller 22 is provided for by modular phone jacks 38, which are connected by an internal bus to the logic circuit 32 as seen in FIG. 3. Connection with the motor 30, power bus 24, sensor 26 and ground are made by cage clamp connectors (not shown) allowing the use of stranded wire without terminals for these connections.

TABLE 1

| ITEM | COMPONENT LIST FOR CONTROLLER | |
|---|---|---|
| | PART # | DESCRIPTION |
| U1 | 4001 | QUAD 2 INPUT NOR GATE |
| U2 | 4011 | QUAD 2 INPUT NAND GATE |
| U3 | 4049 | HEX INVERTOR |
| U4 | UDN2953B | BI-POLAR MOTOR CONTROL |
| U5 | LM7805 | VOLTAGE REGULATOR |
| R1-R13 | | 10K OHM, 0.25 W |
| R14 | | 1K OHM, 0.25 W |
| R15 | | 33K OHM, 0.25 W |
| R16 | | 100 OHM, 0.5 W |
| R17 | | 0.3 OHM, 1 W |
| R18 | | 100 OHM, 0.50 W |
| D1 | IN4004 | |
| D2-D5 | 1N914 | |
| C1-C7 | | 0.1 uF |
| C8 | | 1 uF |
| C9 | | 22 uF |
| C10 | | 330 pF |
| C11 | | 22 uF |

Figure 4:
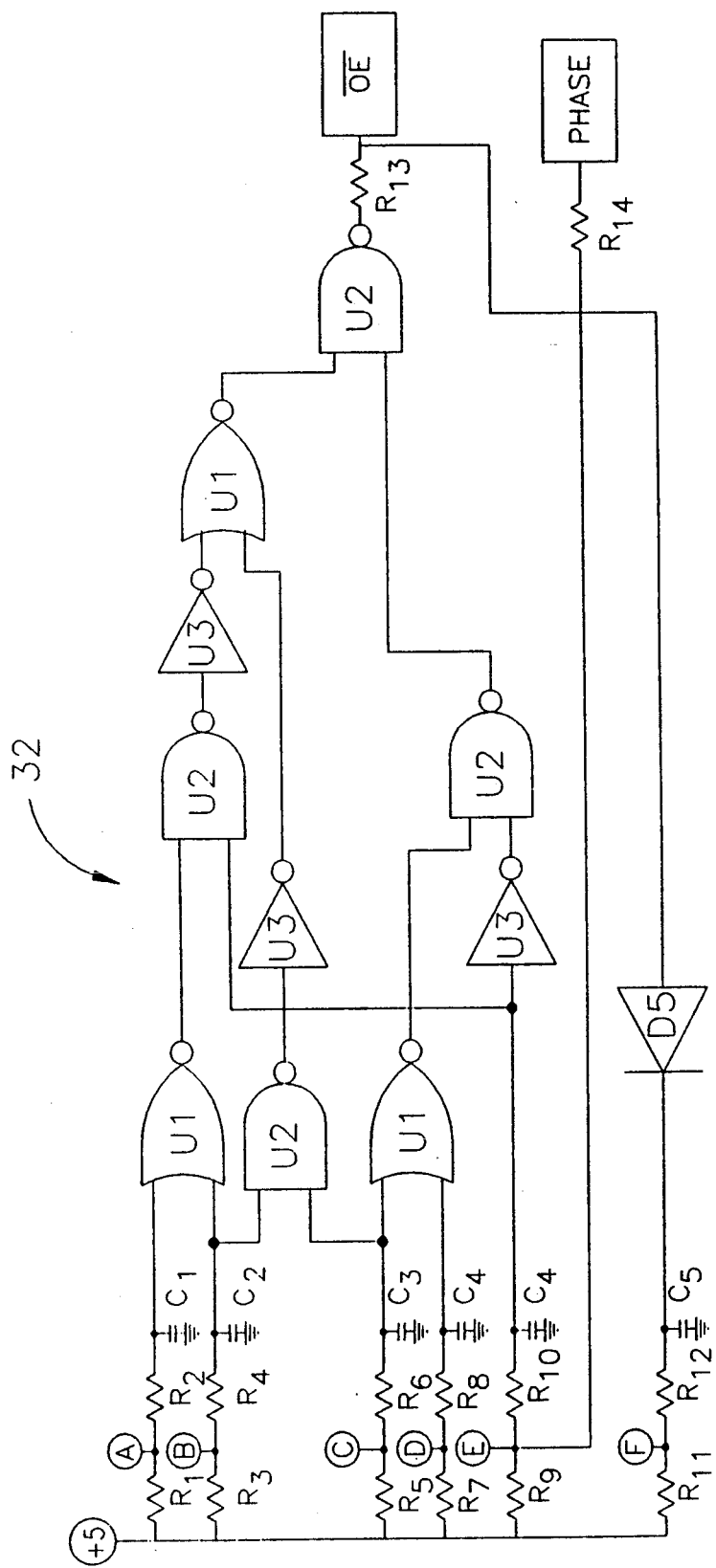
FIG. 4 is an electrical schematic of the logic circuit of the controller.

FIG. 4 is a schematic diagram of the logic circuit 32. The logic circuit 32 has four status inputs A, B, C, and D which represent the status of respective zones. When loads are being conveyed from right-to-left, as shown in FIG. 2, input A represents the status of the zone downstream of the zone being controlled, input B represents the status of the controlled zone, and input C represents the status of the upstream zone. Input D represents the status of the zone two zones up from the controlled zone. Input D has no effect on the output of the controller 22 when articles are being conveyed right-to-left. When loads are being conveyed left-to-right, input B represents the status of the zone upstream of the zone being controlled, input C represents the status of the zone being controlled, and input D represents the status of the zone downstream of the zone being controlled. Input A represents the status of the zone two zones up from the controlled zone and has no effect on the output of a controller 22.

The controller 22 also has two user defined inputs, E and F, which represent the operational parameters of the conveyor. Input E represents the direction of the conveyor (e.g. right-to-left). The F input is an override signal allowing a "slug release" as will be hereinafter described.

The logic circuit 32 has two outputs. The first output (OE) is used to enable or disable the power circuit 34. The second output (PHASE) is used to control the phase of the motor 30 and thus the direction of the conveyor 10.

Table 2 below is a truth table for the logic circuit shown in FIG. 4 describing the function of the logic circuit. For inputs A, B, C, and D the full condition is represented by a logical low (0 VDC), and the empty condition is represented by a logical high (+5 VDC). For input E, a logical high represents right-to-left movement, and a logical low represents left-to-right movement. For input F, normal mode is represented by a logical high. For output OE, a logical high disables the power circuit 34 causing the zone 18 to turn off. A logical low enables the power circuit 34 causing the zone 18 to run.

TABLE 2

TRUTH TABLE FOR LOGIC CIRCUIT

| A | B | C | D | E | F | MODE | OE |
|---|---|---|---|---|---|------|-----|
| FULL | FULL | FULL | X | R-to-L | NO | ACCUMULATE | STOP |
| FULL | FULL | EMPTY | X | R-to-L | NO | ACCUMULATE | STOP |
| FULL | EMPTY | FULL | X | R-to-L | NO | ACCEPT | RUN |
| FULL | EMPTY | EMPTY | X | R-to-L | NO | STANDBY | STOP |
| EMPTY | FULL | FULL | X | R-to-L | NO | DISCHARGE | RUN |
| EMPTY | FULL | EMPTY | X | R-to-L | NO | DISCHARGE | RUN |
| EMPTY | EMPTY | FULL | X | R-to-L | NO | ACCEPT | RUN |
| EMPTY | EMPTY | EMPTY | X | R-to-L | NO | STANDBY | STOP |
| X | FULL | FULL | FULL | L-to-R | NO | ACCUMULATE | STOP |
| X | FULL | FULL | EMPTY | L-to-R | NO | DISCHARGE | RUN |
| X | FULL | EMPTY | FULL | L-to-R | NO | ACCEPT | RUN |
| X | FULL | EMPTY | EMPTY | L-to-R | NO | ACCEPT | RUN |
| X | EMPTY | FULL | FULL | L-to-R | NO | ACCUMULATE | STOP |
| X | EMPTY | FULL | EMPTY | L-to-R | NO | DISCHARGE | RUN |
| X | EMPTY | EMPTY | FULL | L-to-R | NO | STANDBY | STOP |
| X | EMPTY | EMPTY | EMPTY | L-to-R | NO | STANDBY | STOP |
| X | X | X | X | X | YES | OVERRIDE | RUN |

As shown in the truth table, the controller 22 generates an enabling signal which is sent to the power circuit and instructs the power circuit to turn on or off. The logic circuit 32 will instruct the power circuit 34 to turn "on" or run when a load is present in the controlled zone and the immediately adjacent downstream zone is empty (discharge mode), or when the controlled zone is empty and the immediately adjacent upstream zone is full (accept mode). Conversely, the logic circuit will instruct the power circuit 34 to turn "off" or stop when a load is present in both the controlled zone and the immediately adjacent downstream zone (accumulate mode), or when no load is present in the controlled zone or the immediately adjacent upstream zone (standby mode). The E input, which indicates the direction of the conveyor, is used by the controller 22 to determine which of the inputs (A, B, C & D) represents the upstream, downstream and controlled zones. When an override signal is received by the controller 22, all zones 18 will be turned "on" irrespective of the location of the loads on the conveyor 22.

Figure 5:
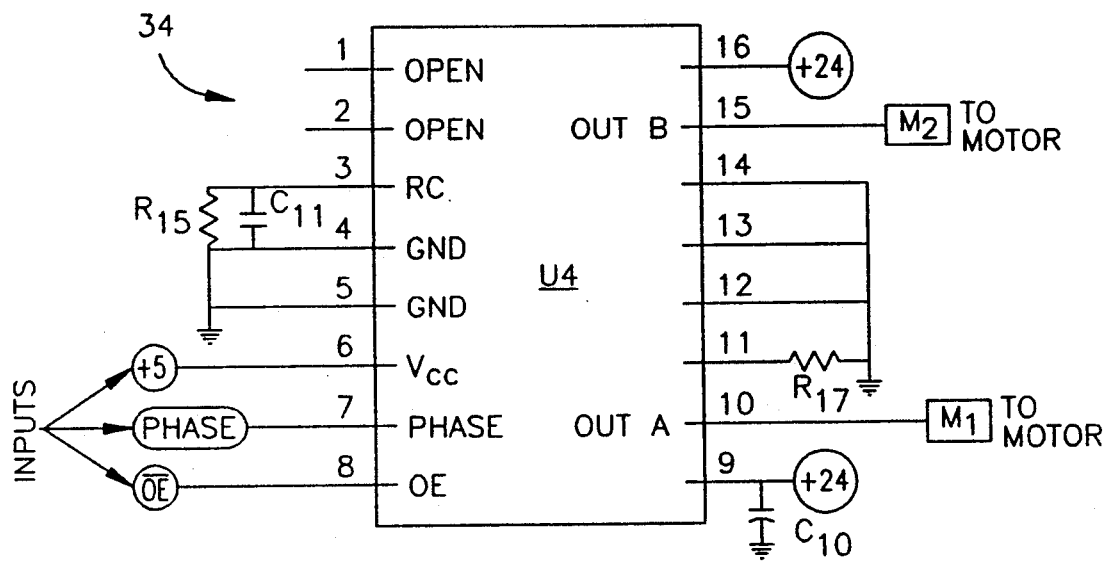
FIG. 5 is an electrical schematic of the power circuit of the controller.

The power circuit 34 is illustrated schematically in FIG. 5, and the components are described in Table 1. The main component of the power circuit 34 is an H-bridge bipolar motor controller U4. The power circuit 34 is responsive to the OE output of the logic circuit 32. When the OE output is low, the power circuit 34 is enabled and supplies power to the corresponding drive roller 16. When the OE output goes high, the power circuit 34 is disabled and current to the drive roller 16 is cut off.

The direction of rotation will be determined by the PHASE output from the logic circuit 32, which is always equal to the E input of any given controller 22. The motor controller U4 directly controls the power to and direction of the drive roller 16. The motor 30 controller U4 includes internal current limiting circuitry to buffer the current each time the DC motor starts and to provide a "soft start" controlling the acceleration of the load being conveyed. The current limiting circuitry also protects the motor 30 from overheating in the case of a physical obstruction which prevents the drive roller 16 from turning when energized. A resistor R16 senses the current supplied to the drive roller 16. If the current exceeds a predetermined limit, then the voltage is regulated to keep the current at the predetermined level. The current limit depends on the value of the resistor R17.

Figure 6:
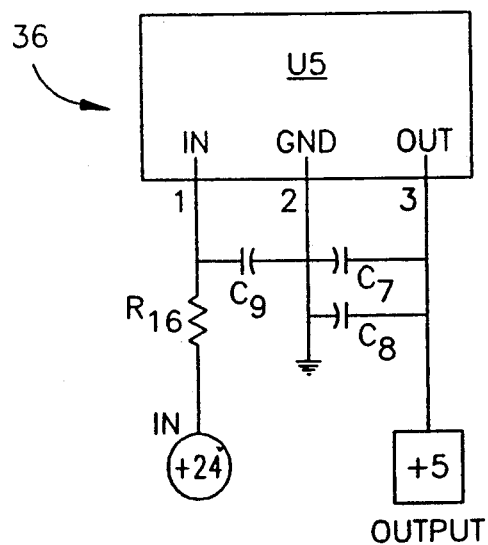
FIG. 6 is an electrical schematic of the voltage regulating circuit of the controller.

The voltage regulator 36, shown in FIG. 6, includes a logic level power supply U5 which provides a constant +5 VDC to the logic circuit 32 and power circuit 34. The output of the voltage regulating circuit 36 may be connected to a spare output jack 40 (FIG. 3) to provide a regulated voltage for optional devices.

Figure 7:
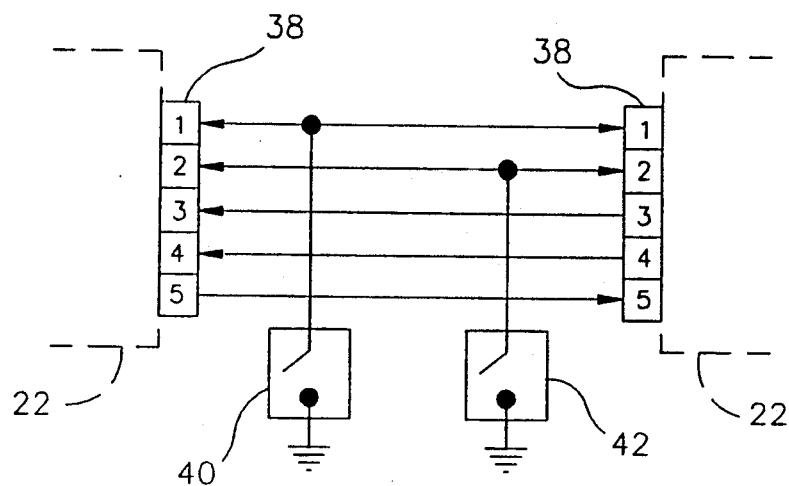
FIG. 7 is a wiring diagram illustrating the direction control and override switches.

The individual controllers 22 for each zone 18 of the conveyor 10 are interconnected by a five-wire data bus. A pair of switches 40 and 42 are connected between any two given zones in the chain as shown in FIG. 7. Switch 40 is an override switch which causes all the interconnected zones 18 to run regardless of whether any loads are present. When switch 40 is closed, the input signal F is pulled from a normal +5 VDC (high) to ground (low) which in turns causes the output OE of the logic circuit to go low thereby enabling the power circuit 34. Switch 42 is a direction control switch. When switch 42 is open, the loads are moved from right-to-left. When switch 42 is closed, the input signal E is pulled from a normal +5 VDC (high) to ground (low) which causes the loads to move from left-to-right.

Figure 8:
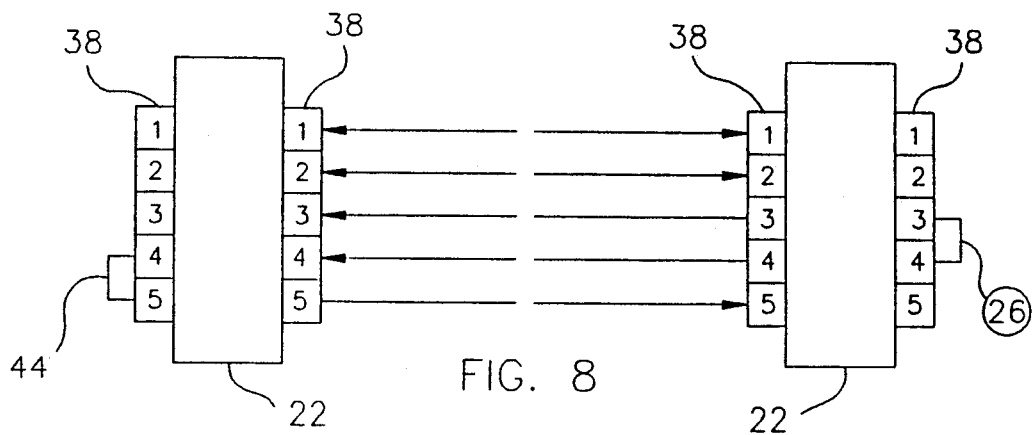
FIG. 8 is a wiring diagram illustrating how to make a controller at the end of the line automatically stop when a load is present.

At each end of the conveyor line, a jumper 44 is installed as shown in FIG. 8. At the left end, the jumper connects pins 4 and 5. At the right end, the final photocell or sensor 26 is connected to both pins 3 and 4 by the jumper 44. The jumper 44 causes the controller 22 to function as if the next adjacent zone (which doesn't actually exist) was full. Thus, when a load reaches the end of the line, it will automatically stop. This mode of operation is most useful in a free-standing conveyor line where loads are manually removed at the end of the line. If there is no need for stopping the load, then the jumper 44 can be removed. By removing the jumper 44, the controller will automatically cause the zone to run when a load is present. This mode of operation is most useful when the conveyor feeds into another conveyor line. Alternately, a switch (not shown) could be interconnected between the third and fourth pins of the controller interface 38 to permit manual or automatic control.

Figure 9:
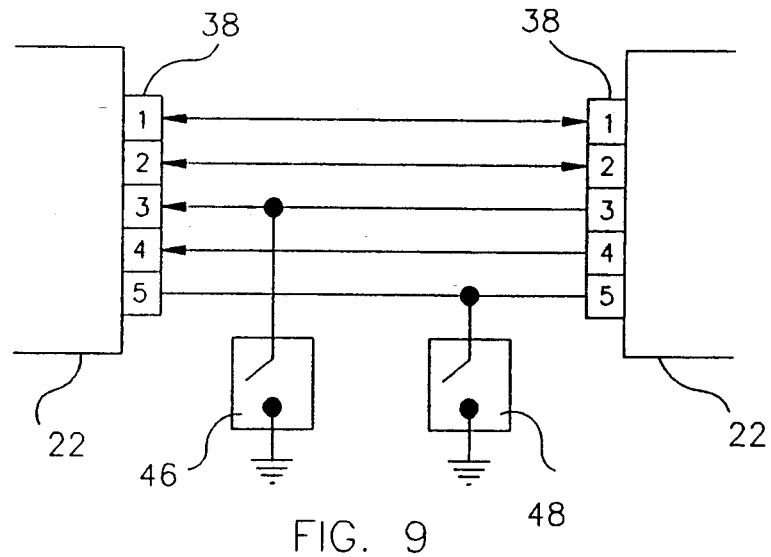
FIG. 9 is a wiring diagram illustrating how to create an index point along the conveyor.

FIG. 9 illustrates how to create an index point along the conveyor line where loads are automatically paused for processing. Switches 46 and 48 are connected between the third and fourth pins of adjacent controllers 22. Switch 46 will cause the zone 18 on the left to become an index point when closed and when the flow is left-to-right. Switch 46 should be left open when the flow is right-to-left otherwise the downstream zone will run continuously in accept mode even when no load is present. Switch 48 will cause the zone 18 on the right to become an index point when closed and when the flow is right-to-left. Switch 48 should be left open when the flow is left-to-right.

Referring now to FIGS. 10-14, there is shown a series of schematic diagrams illustrating the operation of the accumulating conveyor 10 of the present invention. FIGS. 10-14 illustrate a conveyor having eight zones. The conveyor 10 is configured as shown in FIG. 8 to stop loads at the end of the conveyor 10.

In FIG. 10, all of the zones are empty. Thus, each zone is in a "standby" mode, i.e. the power is turned off, since there are no loads present which need to be conveyed. In FIG. 11, an article is present in zone 6 which is indicated as being full. All remaining zones are empty. In this case, the operation of the controllers 22 will cause zones 5 and 6 to be energized while all other zones are turned off. Zone 5 is in an "accept" mode. That is, zone 5 is turned on to receive the article being conveyed from the adjacent upstream zone. Zone 6 is in a "discharge" mode. It is turned on to discharge the article present in that zone to the adjacent downstream zone. All other zones are in a standby mode, and are turned off. It should be readily apparent that once the article is zone 6 is transferred to zone 5, zone 6 would return to standby mode and would be turned off while zone 4 would be turned on to continue conveying the article downstream on the conveyor.

In FIG. 12, articles 1, 2, and 3 have been conveyed to the downstream end of the conveyor. Article 1 has come to rest in zone 1 of the conveyor which is turned off. The controller for zone 1 will remain off until a load is removed. Zones 2 and 3 are also turned off and are in an "accumulate" mode due to the obstruction in the immediately adjacent downstream zone. Zones 4 and 7 are both empty and are turned on to accept loads 4 and 5 respectively from the adjacent upstream zones. Thus, zones 4 and 7 are in an "accept" mode. Zones 5 and 8 are turned on to convey loads 4 and 5 to the adjacent downstream zone. Zone 6 is empty and is in a standby mode since no load is present in the adjacent upstream zone.

In FIG. 13, load 1 has been removed and load 2 has been conveyed to zone 1. Zone 2 is empty and is turned on to receive load 3 from the adjacent upstream zone. Zone 3 is likewise turned on to convey load 3 towards the downstream zone. Loads 4, 5, and 6 are present in zones 4, 5, and 6 respectively which are turned off due to the obstruction in the adjacent downstream zones. Zones 7 and 8 are empty and remain in a "standby" mode.

In FIG. 14, a "slug release" command has been given to override the normal operation of the conveyor 10. When the slug release command is received by the controllers 22, all zones 18 of the conveyor are simultaneously energized whether or not an article is present in that zone or in the adjacent zones. Of course, the "slug release" command could be used to override only a portion of the zone controllers 22 by severing the data bus line between the first terminals of adjacent zones.

Based on the foregoing, it should be apparent that the accumulating conveyor of the present invention has significant advantages over prior art conveyors due to the fact that typically only 20%-50% of the system will be actually in motion at any given time. As a result, there will be a significant reduction in the energy required to operate the system, a significant reduction in the amount of noise produced, and extended system life due to reduced mechanical wear. The conveyor of the present system is also easy to install and maintain. The system substantially reduces the mechanical components. There is no need for compressed air or associated plumbing. The entire system is powered from a low-voltage, two-wire power bus which can also be used to power the photocells.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

I claim:

1. An accumulating conveyor for selectively transporting articles in either a forward or a reverse direction, comprising:
   (a) a plurality of accumulating zones disposed in end-to-end relationship and defining a path for conveying articles;
   (b) an electric motor for each accumulating zone and operative to independently drive a respective accumulating zone in either of the forward or reverse directions;
   (c) a sensor disposed between each pair of end-to-end zones for sensing the presence or absence of an article in each end-to-end zone, wherein each sensor is operative to sense the presence or absence of an article in a first one of the end-to-end zones when the conveyor is operated in the forward direction and senses the presence or absence of an article in the other end-to-end zone when the conveyor is operated in the reverse direction; and
   (d) an individual controller operatively connected to each accumulating zone of the conveyor with each controller controlling the movement of an article on a controlled zone associated with the controller, wherein each controlled zone is disposed between first and second adjacent zones which alternatively function as an upstream zone or a downstream zone depending on the direction of operation of the conveyor, each controller including:
      (1) a first condition input indicative of the condition of the downstream zone when the conveyor is run in the forward direction;
      (2) a second condition input indicative of the condition of the controlled zone when the conveyor is run in the forward direction and indicative of the condition of the upstream zone when the conveyor is run in the reverse direction;

(3) a third condition input indicative of the condition of the upstream zone when the conveyor is run in the forward direction and indicative of the condition of the controlled zone when the conveyor is run in the reverse direction;

(4) a fourth condition input indicative of the condition of the downstream zone when the conveyor is run in the reverse direction;

(5) a direction input indicative of the direction of operation of the conveyor; and (6) a logic circuit responsive to said first, second, third and fourth condition inputs and said direction input for activating the controlled zone when either: (a) a load is present in the controlled zone and no load is present in the downstream zone; or (b) a load is present in the upstream zone and no load is present in the controlled zone.

2. The conveyor of claim 1 wherein each condition input of a controller is connected to a different sensor.

3. The conveyor of claim 2 wherein the first condition input of a controller does not affect the activation of the controlled zone when the conveyor is operated in the reverse direction, and wherein the fourth condition input does not affect the activation of the controlled zone when the conveyor is operated in the forward direction.

4. The conveyor of claim 3 wherein the second condition input is connected to the sensor disposed between the controlled zone and the first adjacent zone, and wherein the third condition input is connected to the sensor disposed between the controlled zone and the second adjacent zone.

* * * * *